(12) United States Patent
Kim et al.

(10) Patent No.: US 12,497,580 B2
(45) Date of Patent: Dec. 16, 2025

(54) BIOREACTOR FOR CELL CULTURE

(71) Applicant: E-CELL CO., LTD., Gyeonggi-do (KR)

(72) Inventors: Doo-Hyun Kim, Seoul (KR); Yun-Kyoung Bang, Incheon (KR)

(73) Assignee: E-CELL CO., LTD., Gyeonggi-do (KR)

( * ) Notice: Subject to any disclaimer, the term of this patent is extended or adjusted under 35 U.S.C. 154(b) by 784 days.

(21) Appl. No.: 17/794,817

(22) PCT Filed: Dec. 2, 2020

(86) PCT No.: PCT/KR2020/017436
§ 371 (c)(1),
(2) Date: Jul. 22, 2022

(87) PCT Pub. No.: WO2021/149906
PCT Pub. Date: Jul. 29, 2021

(65) Prior Publication Data
US 2023/0085157 A1    Mar. 16, 2023

(30) Foreign Application Priority Data

Jan. 23, 2020  (KR) .................. 10-2020-0009214

(51) Int. Cl.
*C12M 1/00* (2006.01)
*C12M 1/06* (2006.01)
*C12M 1/12* (2006.01)
*C12M 1/42* (2006.01)
*C12M 3/00* (2006.01)

(52) U.S. Cl.
CPC ........... *C12M 23/06* (2013.01); *C12M 25/06* (2013.01); *C12M 27/06* (2013.01); *C12M 29/18* (2013.01); *C12M 35/04* (2013.01)

(58) Field of Classification Search
CPC ............................ C12M 27/02; C12M 35/04
See application file for complete search history.

(56) References Cited

U.S. PATENT DOCUMENTS

| | | | |
|---|---|---|---|
| 4,508,455 A | 4/1985 | Lerman et al. | |
| 6,245,555 B1* | 6/2001 | Curtis ................. | C12M 27/02 |
| | | | 435/292.1 |
| 2009/0027997 A1* | 1/2009 | Meier ................... | C12M 23/28 |
| | | | 366/281 |
| 2009/0130704 A1 | 5/2009 | Gyure | |
| 2009/0275121 A1* | 11/2009 | Greller .............. | C12M 27/22 |
| | | | 435/295.1 |

(Continued)

FOREIGN PATENT DOCUMENTS

| | | | |
|---|---|---|---|
| EP | 2039754 A1 * | 3/2009 | |
| KR | 100364478 B1 | 12/2002 | |

(Continued)

*Primary Examiner* — Nathan A Bowers
(74) *Attorney, Agent, or Firm* — Young Basile Hanlon & MacFarlane, P.C.

(57) ABSTRACT

The present invention relates to a bioreactor for cell culture. According to an embodiment of the present invention, vibration is provided to a cell culture solution (solution) to facilitate cell separation, and, since the vibration is transmitted to the entire cell culture solution without dead zones, cell separation efficiency is excellent.

7 Claims, 6 Drawing Sheets

(56) References Cited

U.S. PATENT DOCUMENTS

| | | | |
|---|---|---|---|
| 2009/0323466 A1* | 12/2009 | Vanhamel | B01F 35/513 |
| | | | 366/341 |
| 2015/0361388 A1* | 12/2015 | Martin | C12N 13/00 |
| | | | 435/305.1 |
| 2016/0281043 A1* | 9/2016 | Watkins | C12M 41/00 |
| 2018/0171087 A1* | 6/2018 | Hanley | C08J 5/042 |
| 2018/0187139 A1* | 7/2018 | Patel | C12M 23/40 |
| 2021/0047602 A1* | 2/2021 | Vang | C12N 5/0636 |
| 2022/0088538 A1* | 3/2022 | Pavlik | F04B 23/06 |

FOREIGN PATENT DOCUMENTS

| | | | |
|---|---|---|---|
| KR | 10-2004-0052514 A | | 6/2004 |
| KR | 10105131 B1 | * | 11/2012 |
| KR | 10-2014-0002842 A | | 1/2014 |
| KR | 10-2017-0025187 A | | 3/2017 |
| KR | 10-2018-0107069 A | | 10/2018 |
| KR | 20230009359 A | * | 1/2023 |

* cited by examiner

BIOREACTOR FOR CELL CULTURE

CROSS-REFERENCE TO RELATED APPLICATION(S)

This application claims priority to and the benefit of Korean Application Patent Serial No. 10-2020-0009214, filed Jan. 23, 2020, the entire disclosure of which is hereby incorporated by reference.

TECHNICAL FIELD

The present invention relates to a bioreactor for cell culture.

BACKGROUND

Currently, various types of bioreactors including a cell incubator are widely used in a great range of fields including medicine, pharmaceuticals, biotechnology, etc., for the purposes of production of reagents or vaccines, development of new drugs, and treatment and researches using stem cells.

A bioreactor refers to a system that artificially reproduces biochemical reaction processes such as decomposition, synthesis or chemical transformation of substances, etc., in the body of an organism, and is also called a bio-reaction device.

Therefore, depending on the details of various operations performed in the bioreactor, different conditions such as nutrients, temperature, humidity, PH, oxygen and carbon dioxide that are suitable for the inside of a container, in which mixing of substances or culturing of cells actually occurs, should be maintained for a predetermined period.

If a material being produced using the bioreactor becomes contaminated, it is common to discard all expensive materials in use. In particular, when culturing cells in a bioreactor, in general, cells rarely have their own immune system. Therefore, the inside of the bioreactor must be completely shielded from the outside in order to prevent contamination. Furthermore, before starting cell culture, the bioreactor is typically subjected to sterilization using an autoclave or gamma rays.

Meanwhile, one of several methods used for cell isolation is to induce cell separation by applying vibration to a target material through ultrasound.

For use of the above method, a predetermined amount of a target substance or solution is generally introduced into a container having a storage space, the container is set in an ultrasonic generator, and then, the ultrasonic generator is driven to vibrate the solution or target substance by ultrasonic waves to induce cell separation. In this case, the vibration generated from the ultrasonic generator is transmitted to the target substance or solution through the container, whereby the vibration is smoothly transmitted to a part in contact with an inner surface of the container to thus actively perform cell separation whereas, for the target substance or solution not in contact with the container due to the solution or substance adjacent to the inner surface of the container, the vibration generated from the ultrasonic generator is transmitted in offset status, hence not performing cell separation in many cases.

As such, desired cell separation occurs only in a specific portion of the target substance or solution and, in order to perform cell separation in a desired amount, the target substance or solution of more than necessary is required. Therefore, there is a problem of consuming costs and time more than necessary for cell separation.

As the technical problem to be achieved by the present invention, an object of the present invention is to provide a bioreactor for cell culture capable of smooth cell separation by evenly transmitting vibration generated from an ultrasonic generator to the entire portion of a solution or substance accommodated in a container.

The object of the present invention is not limited thereto, and other objects not mentioned herein will be clearly understood by persons having ordinary skill in the art ("those skilled in the art") from the following description.

In order to achieve the above purposes, one embodiment of the present invention provides a bioreactor for cell culture, which includes: an upper open-type container in which a cell culture medium (solution) is accommodated; a pedestal seated on the top of the container, which is sealed with a sealing member between the top of the container and the pedestal and has an opening hole formed in the center thereof; a head plate which is seated and mounted on the pedestal to block the opening hole of the pedestal, and is provided with a shaft hole in the center thereof; a stirring motor fixed on the head plate; a hollow stirring shaft connected to the stirring motor, which is immersed in the cell culture solution; a stirring blade mounted on the stirring shaft, which rotates together with the stirring shaft and agitates the cell culture solution, and includes an inner vibrating member to transmit vibration generated by an ultrasonic generator to the cell culture solution around the stirring shaft, thereby inducing cell separation; and an outer vibrating member mounted on an outer surface of the container, which transmits the vibration generated from the ultrasonic generator to the cell culture solution through the container wherein the vibration is transmitted to the cell culture solution near an inner peripheral surface of the container so as to separate the cells.

Further, with regard to the bioreactor for cell culture provided by the present invention, the bioreactor may further include a built-in type cell culture module mounted between the head plate and the stirring blade inside the container, which enables the cells to be adhered and cultured.

Further, with regard to the bioreactor for cell culture provided by the present invention, the built-in type cell culture module may include: a hollow tube installed to be spaced apart from an outer peripheral surface of the stirring shaft, in which an upper end is fixed to the head plate; a perforated bin provided integrally on an outer peripheral surface of the hollow tube, in which perforated holes are formed to circulate the cell culture solution to the entire surface; at least one or more spiral tubes disposed to connect between upper and lower plates of the perforated bin, in which perforated holes are formed to circulate the cell culture solution; an ultrasonic vibrator mounted on a coupling site with the head plate of the hollow tube, and the bioreactor may further include an outlet provided at an upper side of the perforated bin in the hollow tube so as to discharge a water flow, which rises from a lower side to an upper side in the hollow tube by the stirring blade, to the outside of the tube.

Further, with regard to the bioreactor for cell culture provided by the present invention, the bioreactor may include an external cell culture module installed outside the container to enable the cells to be adhered and cultured, wherein the external cell culture module includes: a module chamber that has an inlet port, through which the cell culture solution in the container is pumped and introduced, at an upper side of the module and an outlet port at a lower side thereof to discharge the cell culture solution; a plurality of cell culture tubes installed in the module chamber; and an ultrasonic vibrator installed on each of the upper side and lateral side of the module chamber.

Further, with regard to the bioreactor for cell culture provided by the present invention, the stirring blade may consist of: an upper stirring blade to agitate upper and middle regions of the cell culture solution; and a lower stirring blade to agitate a lower region of the cell culture solution, while the inner vibrating member is installed on each of the upper stirring blade and the lower stirring blade.

Further, with regard to the bioreactor for cell culture provided by the present invention, the inner vibrating member may be connected to the ultrasonic generator by an electric wire through a hollow part of the stirring shaft.

Further, with regard to the bioreactor for cell culture provided by the present invention, the inner vibrating member may be inserted and installed inside a housing after providing the housing on the opposite side of a stirring surface of the stirring blade.

Further, with regard to the bioreactor for cell culture provided by the present invention, the housing may be provided with a plurality of ridges to increase a contact area with the cell culture solution on a surface of the housing, wherein the ridge is formed in a streamlined and curved shape.

Further, with regard to the bioreactor for cell culture provided by the present invention, the container may be made of glass or stainless steel.

In addition, with regard to the bioreactor for cell culture provided by the present invention, each surface of the stirring shaft and the stirring blade may be coated with an anti-corrosion agent, wherein the anti-corrosion agent may be composed of 40 to 55% by weight ("wt. %") of epoxy resin, 5 to 10 wt. % of ethyl acrylate, 0.5 to 5 wt. % of polyvinyl chloride, 0.1 to 4 wt. % of silicon resin, 12 to 21 wt. % of diphenylmethane diisocyanate, 15 to 23 wt. % of aluminum oxide, 5 to 10 wt. % of magnesium silicate, 2 to 8 wt. % of calcium carbonate, 0.5 to 11 wt. % of calmite nitrite, and 0.8 to 0 wt. % of zinc oxide.

According to an embodiment of the present invention, vibration is applied to a cell culture medium (solution) to ensure smooth cell separation, and the vibration may be transmitted to the entire portion of the cell culture solution without dead area, thereby achieving an advantage of excellent cell separation efficiency.

DETAILED DESCRIPTION

The configuration shown in the embodiments and drawings described in the present specification is only a preferred example of the disclosed invention, and there may be various modifications that can replace the embodiments and drawings of the present specification at the time of filing the present application.

Further, the same reference numbers or numerals in each drawing in the present application indicate parts or components that implement substantially the same functions.

Further, the terms used herein are being used to describe the embodiments, and are not intended to restrict or limit the disclosed invention. The singular expression also includes the plural expression unless the context clearly dictates otherwise. In the present specification, terms such as "include" or "have" are intended to designate that a feature, number, step, operation, component, part or combination thereof described in the specification exists, they do not preclude the possibility of presence or addition of one or more other features, numbers, steps, operations, components, parts or combinations thereof.

Further, terms including an ordinal number such as "first", "second", etc. used herein may be used to describe various elements, but the elements are not limited by the terms, and the terms are used only for the purpose of distinguishing one component from another. For example, without departing from the scope of the present invention, a first component may be referred to as a second component and, similarly, a second component may also be referred to as a first component.

On the other hand, the terms "front", "rear", "upper", "lower", "front end" and "bottom", etc. are defined based on the drawings, and the shape and location of each component are not limited by the above terms.

Hereinafter, embodiments of the present invention will be described.

Figure 1:
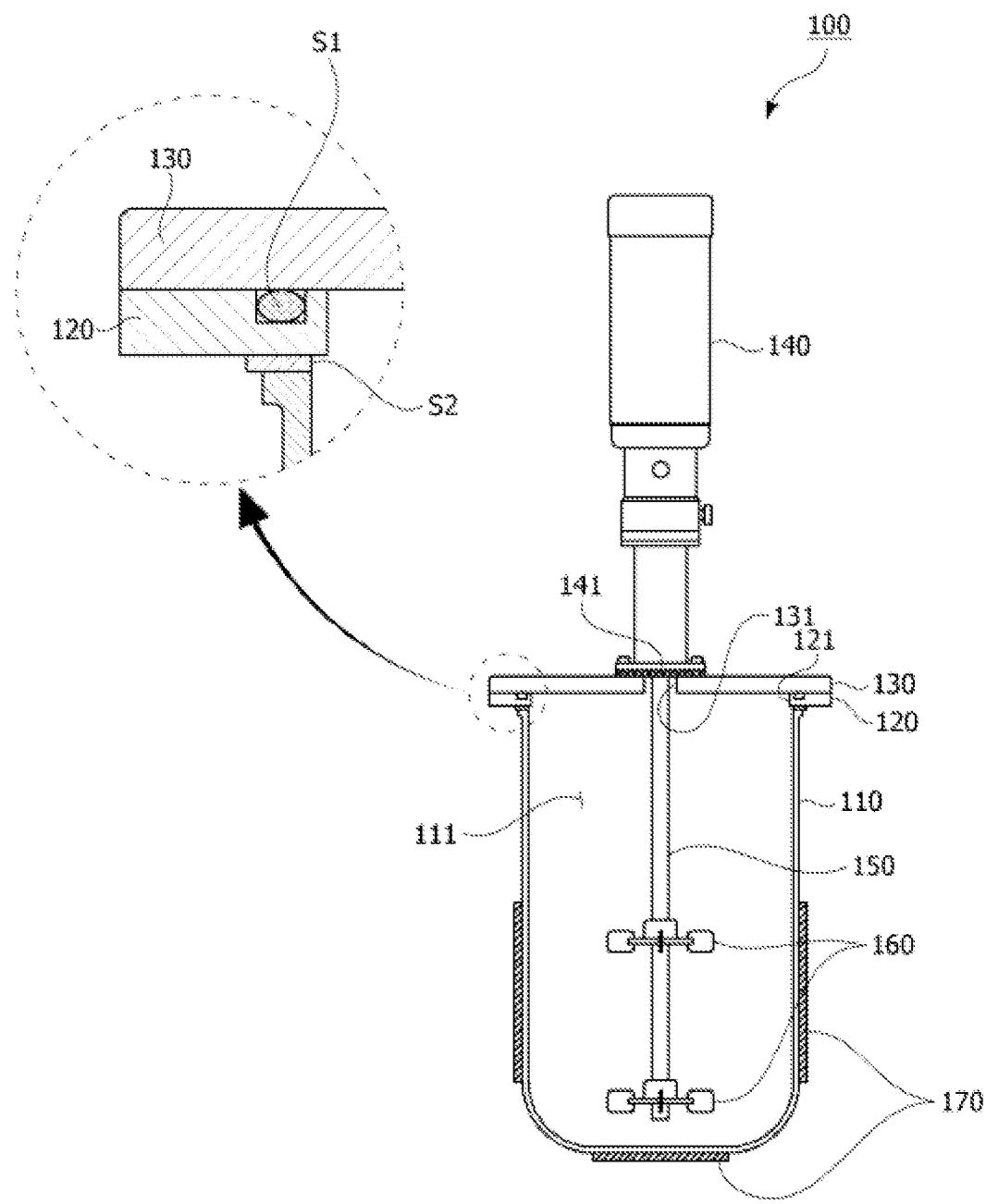
FIG. 1 is a cross-sectional view of the bioreactor for cell culture according to an embodiment of the present invention.
Figure 2:
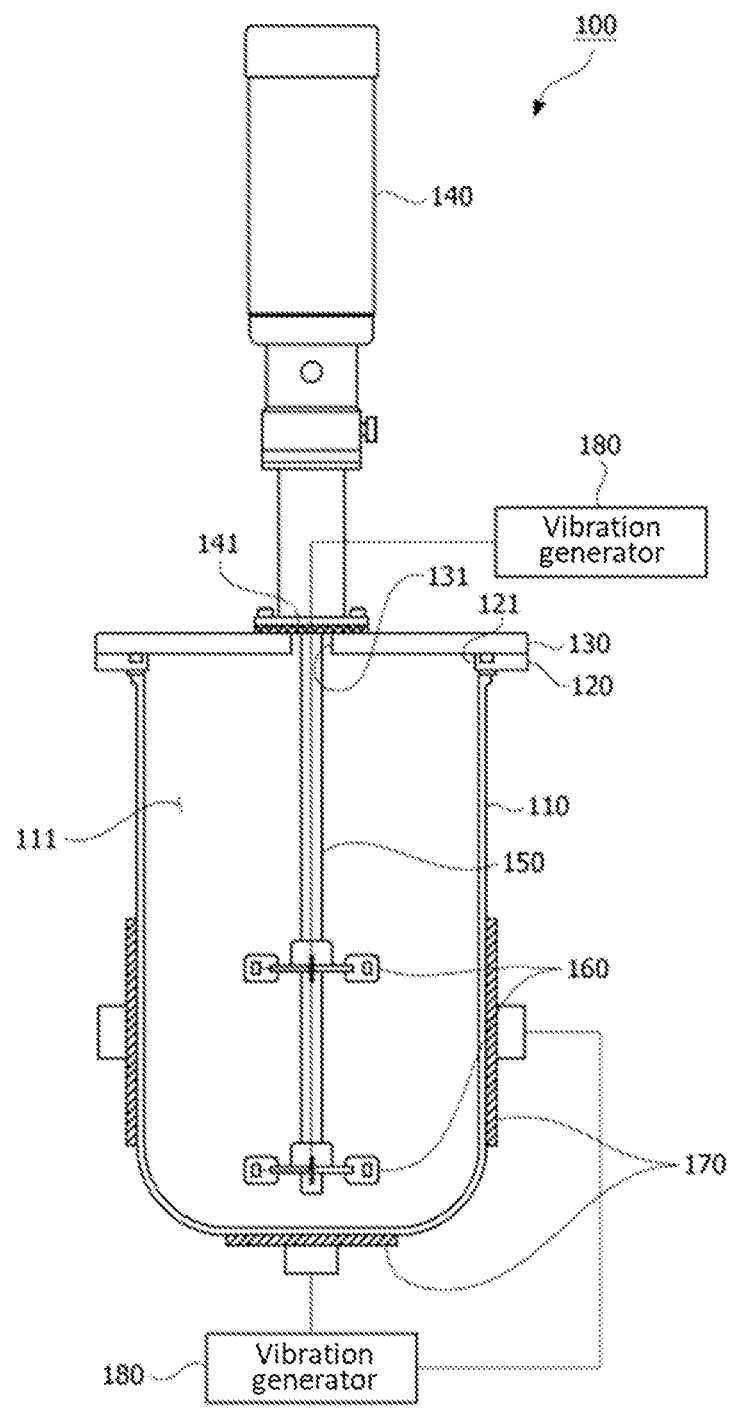
FIG. 2 illustrates a connection diagram between an ultrasonic generator and a vibrating member in the bioreactor for cell culture according to an embodiment of the present invention.
Figure 3:
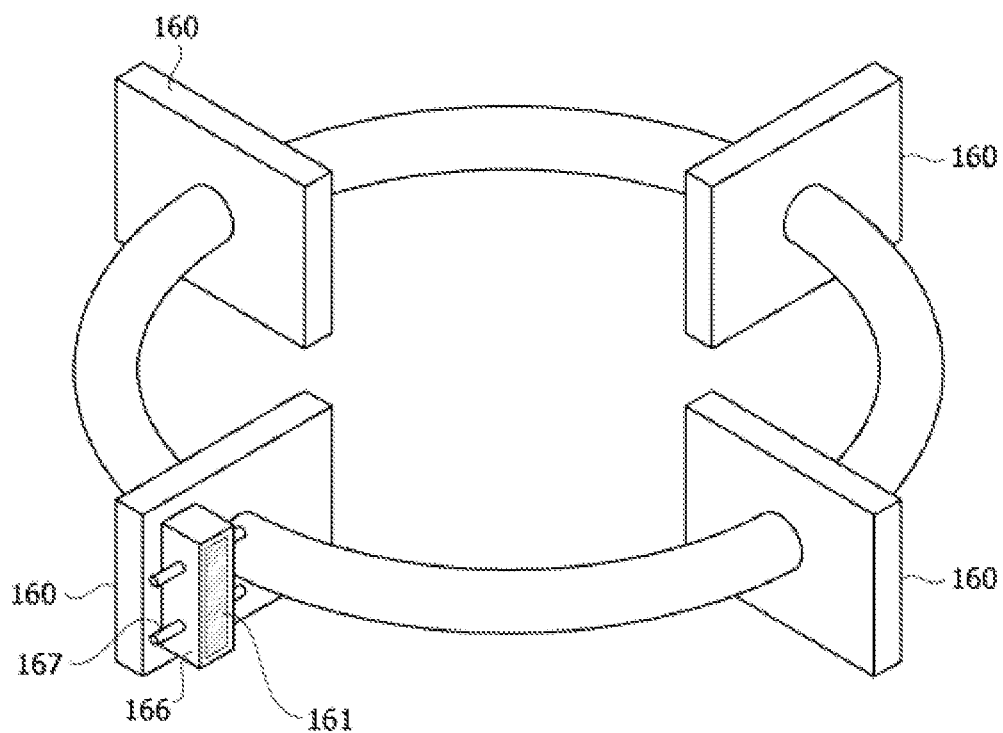
FIG. 3 is a perspective view showing part A extracted from FIG. 1.

In the accompanying drawings, FIG. 1 is a cross-sectional view of the bioreactor for cell culture according to an embodiment of the present invention; FIG. 2 illustrates a connection diagram between an ultrasonic generator and a vibrating member in the bioreactor for cell culture according to an embodiment of the present invention; and FIG. 3 is a perspective view showing part A extracted from FIG. 1.

Referring to the above drawings, a reactor 100 for cell culture according to an embodiment of the present invention may include a container 110, a pedestal 120, a head plate 130, a stirring motor 140, a stirring shaft 150, a stirring blade 160 provided with an inner vibrating member 161, and an outer vibrating member 170.

The container 110 may be provided with a chamber 111 in which a cell culture medium (or solution) for separating cells is introduced and stored, wherein an upper part is open and a lower part is closed, and the solution can be introduced into the container through the opened upper part.

Herein, a material of the container 110 may be any one of glass, stainless steel and plastic, in the case of a disposable container, it may be made of plastic.

The pedestal 120 is seated on the opened upper part of the container 110 for sealing between the container 110 and the head plate 130, may have a flat plate shape and an opening hole 121 corresponding to a size of an opening in the container 110, which is formed in the center of the pedestal.

On the top surface of the pedestal 120, a sealing groove 122, into which an upper sealing member S1 is press-fitted, may be formed so as to perform sealing with the head plate 130. Further, a lower sealing member S2 may be provided on the bottom surface of the pedestal to perform sealing with the top of the container 110.

In this case, if the lower sealing member S12 is placed only the top of the container 110, there is a risk of separation due to incomplete coupling. Therefore, the above member may be configured in a cap shape and fitted to the top of the container 110. Alternatively, a method of forming a fitting groove in the bottom surface of the pedestal 120, into which a part of the lower sealing member S2 can be fitted, may also be applied.

The head plate 130 is seated and installed on the pedestal to block the opening hole 121 of the pedestal 120, and may be provided with a shaft hole 131 in the center thereof.

Since the head plate 130 is seated and installed on the pedestal 120, the upper sealing member S1 may be compressed and deformed by a binding force of the head plate, so as to perform sealing between the pedestal 120 and the head plate 130.

The stirring motor 140 may impart rotational power necessary to agitate the solution accommodated in the container 110 while being fixed on the head plate.

The stirring motor 140 may be fixed to the head plate 130 after a motor shaft (not shown) thereof is disposed to face the container 110. Herein, a shaft hole-blocking pad 141 may be mounted between the bottom surface of the stirring motor 140 and the head plate 130 in order to block the shaft hole 131.

The stirring shaft 150 may be immersed in the cell culture solution while being connected to a motor shaft (not shown) of the stirring motor 140. Herein, the stirring shaft 150 is preferably hollow in order to pass an electric wire therethrough.

As described above, since the stirring shaft 150 is immersed in the cell culture solution, a surface of the stirring shaft is preferably coated with an anti-corrosion coating agent to prevent corrosion thereof.

The anti-corrosion coating agent may comprise 40 to 55 wt. % of epoxy resin, 5 to 10 wt. % of ethyl acrylate, 0.5 to 5 wt. % of polyvinyl chloride, 0.1 to 4 wt. % of silicon resin, 12 to 21 wt. % of diphenylmethane diisocyanate, 15 to 23 wt. % of aluminum oxide, 5 to 10 wt. % of magnesium silicate, 2 to 8 wt. % of calcium carbonate, 0.5 to 11 wt. % of calmite nitrite and 0.8 to 9 wt. % of zinc oxide.

The epoxy resin serves to increase storage stability to thus protect the surface of the stirring shaft as an object to be coated ("coating object"), and any one selected from bisphenol A type epoxy resin or bisphenol F type epoxy resin, or a mixture of the above two compounds may be used.

A mixing amount of the epoxy resin is suitably 40 to 55 wt. %. If the mixing amount is less than 40 wt. %, a film for protecting the surface of the coating object cannot be completely formed due to insufficient epoxy resin content. On the other hand, if the mixing amount is more than 55 wt. %, an added amount of other mixtures is reduced, resulting in deterioration in chemical resistance and adhesiveness of the coating object.

Ethyl acrylate is intended to improve durability such as workability, ductility, acid resistance, alkali resistance, and the like, and a mixing amount of 5 to 10 wt. % is desirably used. If the mixing amount is less than 5 wt. %, effects of improving durability and strength are weak. On the other hand, when the mixing amount is more than 10 wt. %, performance is improved but material separation is likely to occur while reducing price competitiveness.

Polyvinyl chloride is intended to improve oil resistance, gas barrier properties, acid resistance and alkali resistance, and a mixing amount of 0.5 to 5 wt. % is desirably used. If the mixing amount is less than 0.5 wt. %, performance improvement is weak. On the other hand, when the mixing amount is more than 5 wt. %, performance is improved but material separation is likely to occur.

The silicon resin is intended to improve water-proof properties, heat resistance and electrical properties, and a mixing amount of 0.1 to 4 wt. % is desirably used. If the mixing amount is less than 0.1 wt. %, performance improvement is weak. On the other hand, when the mixing amount is more than 4 wt. %, performance is improved but price competitiveness is reduced.

Diphenylmethan isocyanate is a kind of hardening agents for strengthening the surface of a coating layer, and a mixing amount of 12 to 21 wt. % is desirably used. If the mixing amount is less than 12 wt. %, performances such as weatherproof properties, stain resistance, UV resistance, etc. are deteriorated. On the other hand, when the mixing amount is more than 21 wt., the above performance items are improved but price competitiveness is reduced.

Aluminum oxide is a kind of pigment that serves to improve color strength on the surface of the coating layer, and a mixing amount of 15 to 23 wt. % is desirably used. If the mixing amount is less than 15 wt. %, coloring may not be attained. On the other hand, when the mixing amount is more than 23 wt. %, the coloring is improved due to an excessive mixing amount but effects of the coating layer may be reduced due to insufficient content of other additives.

Magnesium silicate is a kind of dispersants that improve storage stability of a coating agent by increasing dispersibility of a mixture and improving an interfacial area, and a mixing amount of 5 to 10 wt. % is desirably used. If the mixing amount is less than 5 wt. %, the dispersibility of any of various mixtures may decrease and the storage stability of the coating agent may be reduced. On the other hand, when the mixing amount is more than 10 wt. %, the storage stability of the coating agent is enhanced due to improved dispersibility but physical properties such as corrosion resistance, adhesiveness, etc. may be deteriorated due to insufficient content of other additives.

Calcium carbonate serves to improve filling property, impact resistance, heat retention and fire resistance, and a mixing amount of 2 to 8 wt. % is desirably used. If the mixing amount is less than 2 wt. %, workability is improved but effects of improving impact resistance, heat retention and fire resistance are weak. On the other hand, when the mixing amount is more than 8 wt. %, performances are improved but workability may be reduced.

Calmite nitrite is intended to improve corrosion resistance and durability, and a mixing amount of 0.5 to 11 wt. % is desirably used. If the mixing amount is less than 0.5 wt. %, effects of improving corrosion resistance and durability are reduced. On the other hand, when the mixing amount is more than 11 wt. %, corrosion resistance and durability are improved but workability and strength may be reduced.

Zinc oxide is intended to improve UV resistance and material separation resistance, and a mixing amount of 0.8 to 9 wt. % is desirably used. If the mixing amount is less than 0.8 wt. %, effects of improving UV resistance and material separation resistance are weak. On the other hand, when the mixing amount is more than 9 wt. %, performances are improved but strength and price competitiveness are reduced.

Meanwhile, the anti-corrosion coating agent according to the present invention may further include 0.3 to 5 wt. % of octyltriethoxysilane in order to improve adhesiveness. Octyltriethoxysilane is possibly used in the form of a monomer, and a molecular weight of the monomer is not particularly limited but preferably 150 to 450 Da.

Further, the anti-corrosion coating agent according to the present invention may further include 0.1 to 0.5 wt. % of sodium benzoate in order to increase visco-elasticity of the coating film. If a content of sodium benzoate is less than 0.1 wt. %, effects are insignificant. On the other hand, when the content is more than 0.5 wt. %, physical properties are deteriorated due to excessive content.

Further, the anti-corrosion coating agent according to the present invention may further include 1 to 8 wt. % of sodium alginate in order to increase viscosity and strengthen adhesiveness. If a content of sodium alginate is less than 1 wt. %, hydrophobicity is lowered. On the other hand, when the content is more than 8 wt. %, viscosity is excessively increased.

Hereinafter, the anti-corrosion coating agent will be descried in more detail by way of examples.

Example 1

50 g of epoxy resin, 7 g of ethyl acrylate, 3 g of polyvinyl chloride, 1 g of silicon resin, 15 g of diphenylmethane diisocyanate, 16 g of aluminum oxide, 6 g of magnesium silicate, 3 g of calcium carbonate, 2 g of calmite nitrite and 1 g of zinc oxide were mixed to prepare an anti-corrosion coating agent.

Example 2

The present example was implemented in the same manner as in Example 1, except that 7 g of sodium alginate was further added.

Example 3

The present example was implemented in the same manner as in Example 1, except that 0.3 g of sodium benzoate was further added.

Example 4

The present example was implemented in the same manner as in Example 1, except that 0.3 g of sodium benzoate was further added.

[Experiment]

After forming a coating film with a thickness of 8 micrometers (μm) on an iron plate of 2×2 cm using the coating composition prepared according to each of the above examples, stability, surface hardness, plastic deformation, adhesion and detachability in the standard state were measured and shown in [Table 1].

TABLE 1

|  | Stability (kg/f) | surface hardness (N/cm2) | Plastic deformation (Amount of change, mm) | Adhesion | Detachability |
| --- | --- | --- | --- | --- | --- |
| Example 1 | 821 | Clear | 0.001202 | Good | No peeling |
| Example 2 | 823 | Clear | 0.001023 | Good | No peeling |
| Example 3 | 814 | Clear | 0.001223 | Good | No peeling |
| Example 4 | 805 | Clear | 0.001247 | Good | No peeling |

As shown in [Table 1] above, it could be confirmed that the coating films in the examples using the above-described coating compositions have little plastic deformation, favorable water-proof property and adhesion, are not easily peeled off from the surface, and exhibit high stability to thus attain high corrosion resistance and chemical resistance.

The stirring blade 160 mounted on the stirring shaft 150 serves to agitate the cell culture solution while rotating together with the stirring shaft, and may include an inner vibrating member 161 that transmits vibration generated by an ultrasonic generator 180 to the cell culture solution around the stirring shaft 150, thereby enabling separation of cells.

Herein, the stirring blade 160 may consist of an upper stirring blade 162 to agitate upper and middle regions of the cell culture solution, and a lower stirring blade 163 to agitate a lower region of the cell culture solution.

Each of the upper and lower stirring blades 162 and 163 may have a boss 164 coupled to the stirring shaft 150 and four (4) unit blades 165 in the form of a vertical plate, which are radially coupled to an outer peripheral surface of the boss.

The inner vibrating member 161 is connected to the ultrasonic generator 180 using an electric wire through a hollow part 151 of the stirring shaft 150 so as to generate vibration, and may be inserted and installed in a housing 166 wherein the housing 166 is provided on the opposite side of a stirring surface of the stirring blade 160. Accordingly, the vibration force of the inner vibrating member 161 is transmitted to the cell culture solution through the housing 166.

In this regard, in order to increase a contact area with the cell culture solution, a plurality of ridges 167 may be provided on the surface of the housing 166. The ridge 167 may be formed to be extended from in a direction far away from the housing 166 or, alternatively, may be configured in a streamlined and curved rod shape. In the latter case, the contact area with the cell culture solution may become wider than that of a linear shape, thereby increasing a vibration transmitting strength.

The outer vibrating member 170 is mounted on the outer surface of the container 110 and serves to transmit the vibration generated by the ultrasonic generator 180 to the cell culture solution through the container 110. Specifically, the outer vibrating member 170 may transmit the vibration to the cell culture solution near an inner peripheral surface of the container 110 so as to separate the cells, thereby dividing the vibration region from that treated by the inner vibrating member 161.

The outer vibrating member 170 may have a pad shape, which can be attached to an outer surface of the container 110 or, alternatively, may be coupled to the container by a separate bracket.

Figure 4:
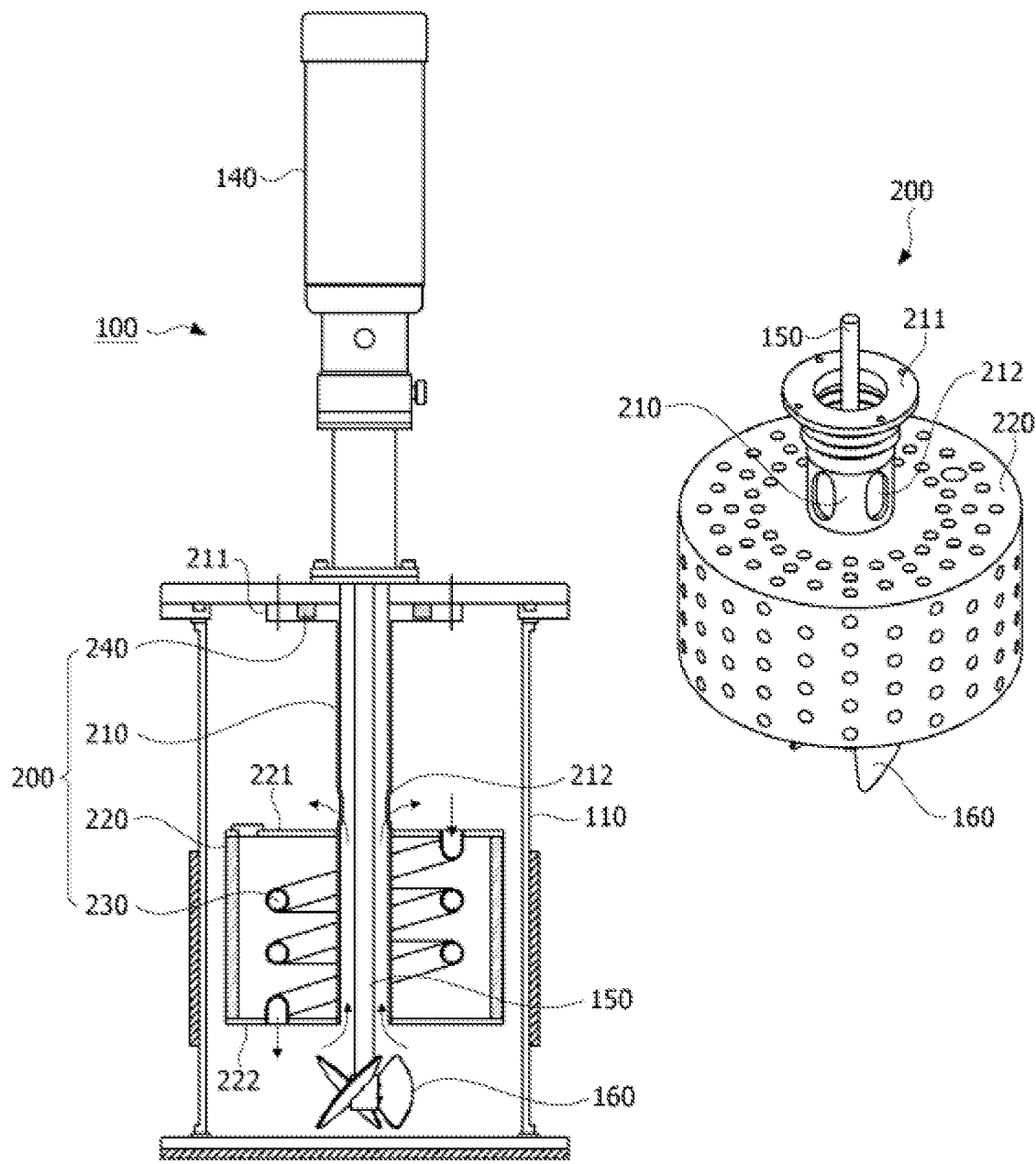
FIG. 4 is a cross-sectional view of the bioreactor for cell culture (built-in type) according to another embodiment of the present invention.

Meanwhile, FIG. 4 is a cross-sectional view of the bioreactor for cell culture according to another embodiment of the present invention.

The bioreactor 100 for cell culture shown in FIG. 4 is substantially the same as the previous embodiments, but is an example capable of enlarging a cross-section for cell culture so as to improve cell culture efficiency.

That is, the above bioreactor 100 for cell culture may further include a built-in type cell culture module 200 disposed between the head plate 130 and the stirring blade 140 inside the container 110.

As described above, the built-in type cell culture module 200 is provided to increase the cell culture efficiency by enlarging an adhesion area of adherent cells.

The built-in type cell culture module 200 is installed to be spaced apart from an outer peripheral surface of the stirring shaft 150, wherein a hollow tube 210 fixed to the head plate 130 is provided on top of the above module.

The built-in type cell culture module 200 is integrally provided on an outer peripheral surface of the hollow tube 210, and may include a perforated bin 220 in which perforated holes are formed to circulate the cell culture solution throughout the entire surface of the module.

The built-in cell culture module 200 may be disposed such that an upper plate 221 and a lower plate 222 of the perforated bin 220 are connected, and may include at least one spiral tube 230 in which perforated holes are formed to circulate the cell culture solution. The spiral tube 220 is a passage through which the cell culture solution is circulated, and may provide a cross-section to which a number of adherent cells can be adhered, thereby improving cell culture efficiency.

Figure 5:
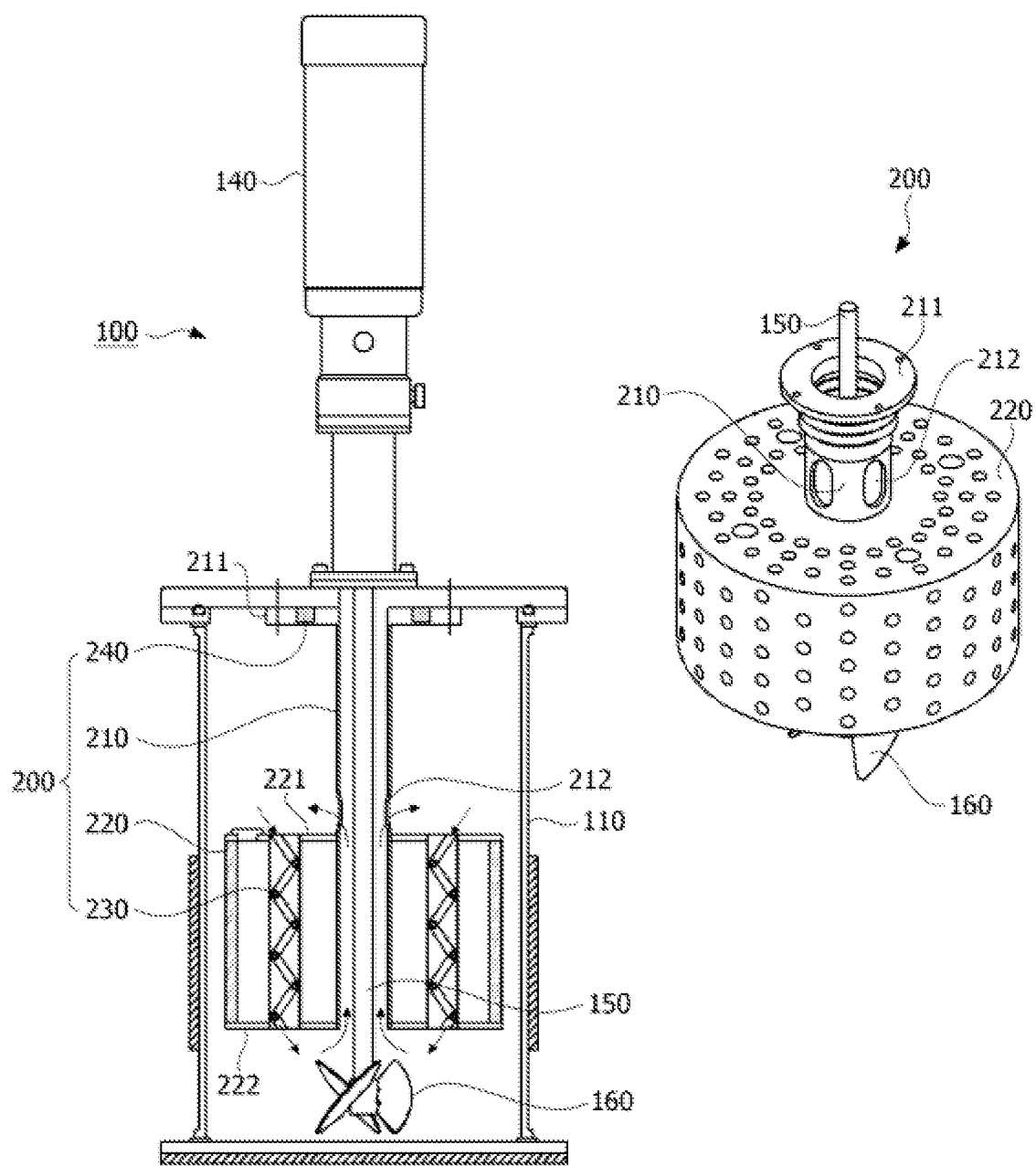
FIG. 5 is a cross-sectional view of the bioreactor for cell culture (built-in type) according to a further embodiment of the present invention.

Herein, as shown in FIG. 4, the spiral tube 230 may comprise a single spiral tube having a relatively large spiral radius. Otherwise, as shown in FIG. 5, several spiral tubes having a relatively small spiral radius may be mounted.

The built-in type cell culture module 200 may include an ultrasonic vibrator 240, which is installed on a flange 211 as a coupling site with the head plate 130 of the hollow tube 210. The ultrasonic vibrator 240 serves to vibrate the built-in type cell culture module 200, thereby promoting cell separation.

Further, on an upper side of the perforated bin 220 of the hollow tube 210, an outlet 212 may be provided to discharge a water flow, which rises from the lower side to the upper side in the hollow tube 210 by the stirring blade 260, to the outside.

With regard to the built-in type cell culture module 200 having the above configuration, the cell culture solution inside the container 110 rises from the lower side to the upper side in the hollow tube 210 through agitation by the stirring blade 160, followed by discharging the rising cell culture solution through the outlet 212 of the hollow tube 210. As the cell culture solution is smoothly stirred while repeating the above process, cell separation effects may be doubled.

Although the embodiments in FIGS. 4 and 5 have illustrated that the perforated bin 220 is built into the container 110, alternatively, an embodiment in which the perforated bin 220 is installed outside the container 110 may also be applied. However, in the case of externally installing the perforated bin 220, it will be of course determined that a separate case should be additionally provided to prevent water leakage to the outside of the perforated bin 220

Figure 6:
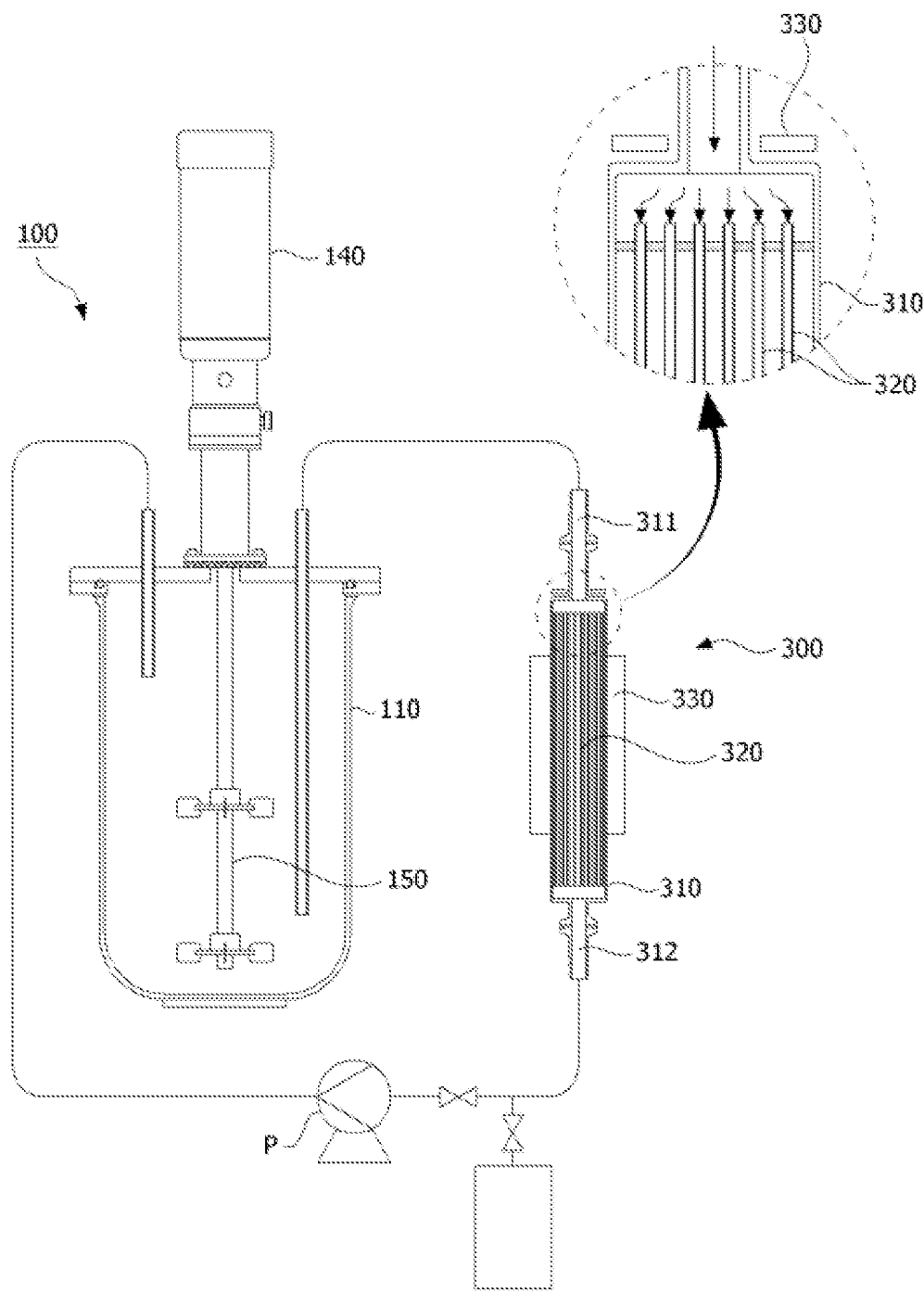
FIG. 6 is a cross-sectional view of the bioreactor for cell culture (external type) according to a still further embodiment of the present invention.

Meanwhile, FIG. 6 is a cross-sectional view of the bioreactor for cell culture according to another embodiment of the present invention.

The bioreactor 100 for cell culture shown in FIG. 6 is substantially the same as the previous embodiments, but is an example for enlarging a cross-section for cell culture so as to improve cell culture efficiency.

That is, with regard to the above bioreactor 100 for cell culture, an external cell culture module 300 for cell adhesion and culture is installed on the outside of the container 110.

The external cell culture module 300 may have an inlet port 311, through which the cell culture solution in the container 110 is pumped and introduced, at an upper side and may include a module chamber 310 provided with an outlet port 312, through which the cell culture solution is discharged, at a lower side thereof.

Herein, the inlet port 311 and the outlet port 312 of the module chamber 310 are connected to the inside of the container through tubes, while a pump P for pumping and circulating the cell culture solution may be mounted in the tube connecting between the outlet port 312 and the container 110.

The external cell culture module 300 may include a plurality of cell culture tubes 320 installed inside the module chamber 310. Each cell culture tube 320 provides a cross-section, to which a great amount of adherent cells or the like is adhered, while the cell culture solution introduced through the inlet port 311 is branched, thereby improving cell culture efficiency.

The external cell culture module 300 may include an ultrasonic vibrator 330 mounted on each of upper side and lateral side of the module chamber 310. The ultrasonic vibrator 330 serves to vibrate the external cell culture module 300 so as to promote cell separation.

As described above, those skilled in the art to which the present invention pertains would understand that the present invention may be implemented in other specific forms without changing the technical spirit or essential characteristics thereof. Therefore, it should be understood that all of the embodiments described above are illustrative and not restrictive. Further, it should be construed that all alterations or modifications derived from the meanings and scope of the appended claims described later and their equivalents, rather than the above detailed description, are being included in the scope of the present invention.

[Description of numeral symbols]

| | |
|---|---|
| 100: Reactor for cell culture | |
| 110: Container | |
| 120: Pedestal | 130: Head plate |
| 140: Stirring motor | 150: Stirring shaft |
| 160: Stirring blade | 161: Inner vibrating member |
| 170: Outer vibrating member | 180: Ultrasonic generator |
| 200: Built-in type cell culture module | 210: Hollow tube |
| 220: Perforated bin | 230: Spiral tube |
| 240: Ultrasonic vibrator | 300: External type cell culture module |
| 310: Module chamber | 320: Cell culture tube |
| 330: Ultrasonic vibrator | |

The invention claimed is:

1. A bioreactor for cell culture, comprising:
an upper open-type container in which a cell culture medium (or solution) is accommodated;
a pedestal seated on a top of the container, which is sealed with a circular seal between the top of the container and the pedestal and has an opening hole formed in the center thereof;
a head plate which is seated and mounted on the pedestal to block the opening hole of the pedestal, and is provided with a shaft hole in the center thereof;
a stirring motor fixed on the head plate;
a hollow stirring shaft connected to the stirring motor, which is immersed in the cell culture solution;
a stirring blade mounted on the stirring shaft, which rotates together with the stirring shaft and agitates the cell culture solution, and includes an inner vibrating plate to transmit vibration generated by an ultrasonic generator to the cell culture solution around the stirring shaft, thereby inducing cell separation; and
an outer vibrating plate mounted on an outer surface of the container, which transmits the vibration generated from a second ultrasonic generator to the cell culture solution through the container wherein the vibration is transmitted to the cell culture solution near an inner peripheral surface of the container to separate the cells;

a built-in type cell culture module mounted between the head plate and the stirring blade inside the container, which enables the cells to be adhered and cultured;

a hollow tube installed to be spaced apart from an outer peripheral surface of the stirring shaft, in which an upper end is fixed to the head plate;

a perforated bin provided integrally on an outer peripheral surface of the hollow tube, in which perforated holes are formed to circulate the cell culture solution throughout the entire surface;

at least one or more spiral tubes disposed to connect between upper and lower plates of the perforated bin, in which perforated holes are formed to circulate the cell culture solution;

an ultrasonic vibrator mounted on a coupling site with the head plate of the hollow tube, and wherein the bioreactor further includes an outlet provided at an upper side of the perforated bin in the hollow tube in order to discharge a water flow, which rises from a lower side to an upper side in the hollow tube by the stirring blade, to the outside of the tube.

2. The bioreactor for cell culture according to claim 1, further including an external cell culture module installed outside the container to enable the cells to be adhered and cultured, wherein the external cell culture module includes:

a module chamber that has an inlet port, through which the cell culture solution in the container is pumped and introduced, at an upper side of the module, and an outlet port at a lower side thereof to discharge the cell culture solution;

a plurality of cell culture tubes installed in the module chamber; and an ultrasonic vibrator installed on each of the upper side and lateral side of the module chamber.

3. The bioreactor for cell culture according to claim 1, wherein the stirring blade consists of:

an upper stirring blade to agitate upper and middle regions of the cell culture solution; and a lower stirring blade to agitate a lower region of the cell culture solution, while the inner vibrating plate is installed on each of the upper stirring blade and the lower stirring blade.

4. The bioreactor for cell culture according to claim 3, wherein the inner vibrating plate is connected to the ultrasonic generator by an electric wire through a hollow part of the stirring shaft.

5. The bioreactor for cell culture according to claim 1, wherein the inner vibrating plate is inserted and installed inside a housing after providing the housing on the opposite side of a stirring surface of the stirring blade.

6. The bioreactor for cell culture according to claim 5, wherein the housing is provided with a plurality of ridges to increase a contact area with the cell culture solution on a surface of the housing; and wherein the ridge is formed in a streamlined and curved shape.

7. The bioreactor for cell culture according to claim 1, wherein the container is made of any one among glass, stainless steel and plastic.

* * * * *